March 27, 1934.  J. G. BLUNT  1,952,488
RAILWAY VEHICLE WHEEL
Filed Dec. 11, 1931  2 Sheets-Sheet 1
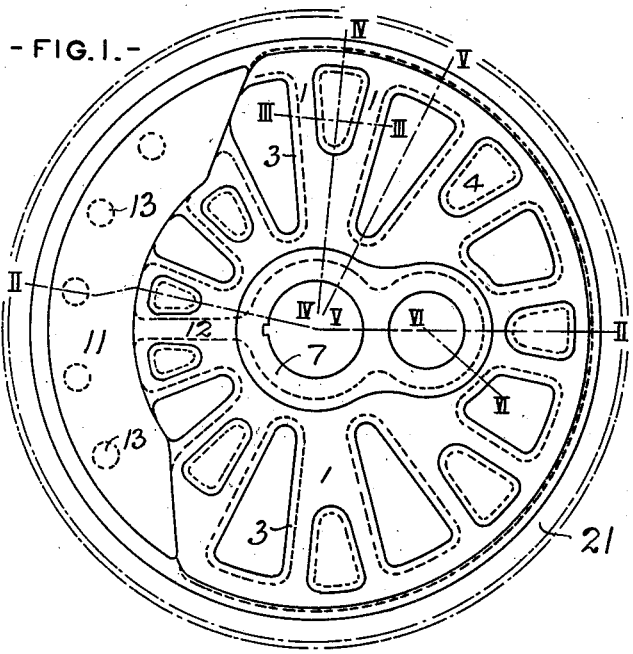
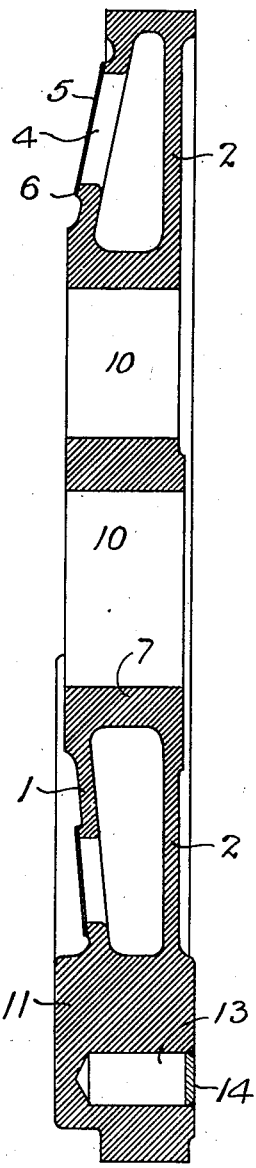
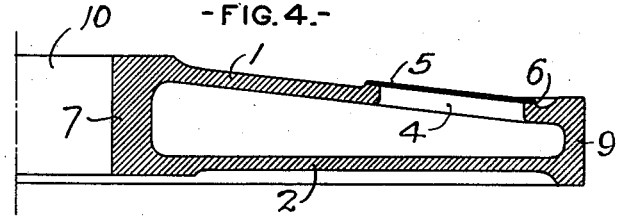
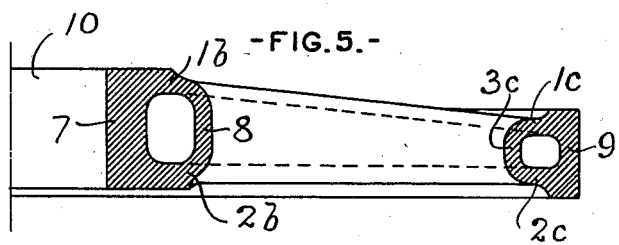
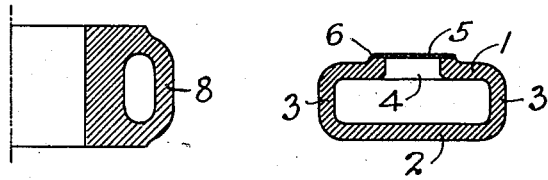
INVENTOR
James G. Blunt
BY S. C. Yeaton
ATTORNEY March 27, 1934.   J. G. BLUNT   1,952,488
RAILWAY VEHICLE WHEEL
Filed Dec. 11, 1931   2 Sheets-Sheet 2
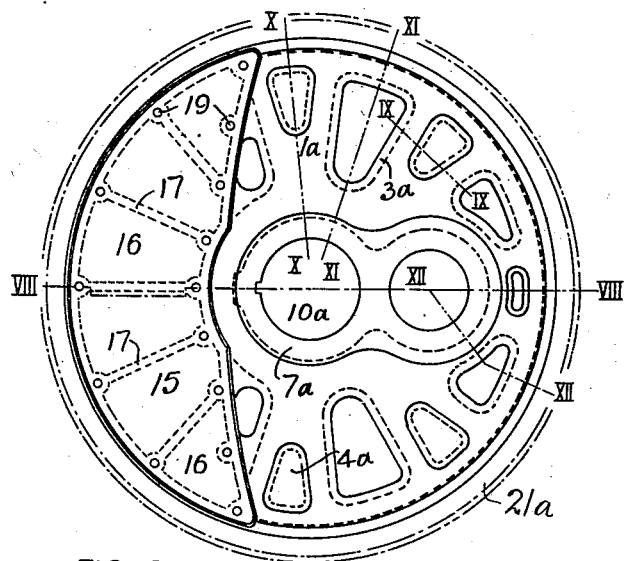
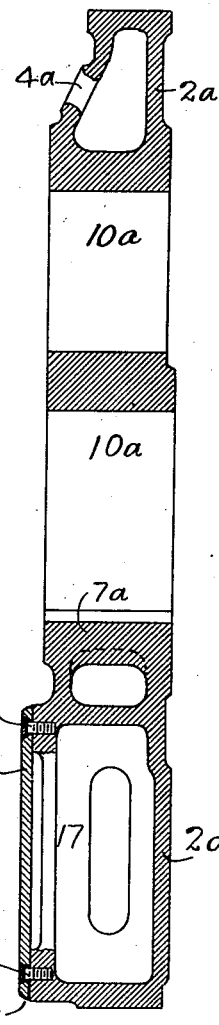
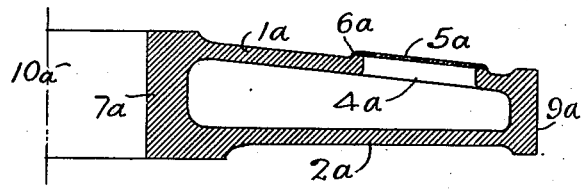
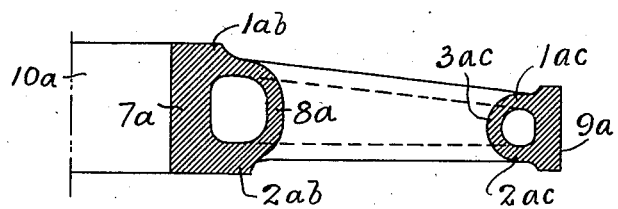
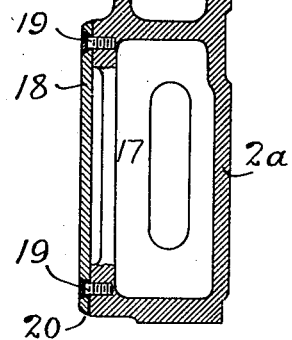
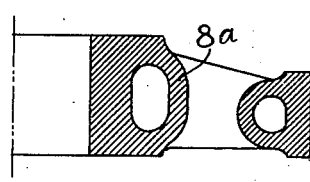
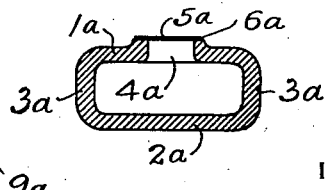
INVENTOR
James G. Blunt
BY
ATTORNEY Patented Mar. 27, 1934

1,952,488

UNITED STATES PATENT OFFICE 1,952,488

RAILWAY VEHICLE WHEEL

James G. Blunt, Schenectady, N. Y., assignor to American Locomotive Company, New York, N. Y., a corporation of New York Application December 11, 1931, Serial No. 580,241

12 Claims. (Cl. 295—27)

The present invention relates chiefly to locomotive driving wheels.

An object of this invention is to provide a driving wheel construction characterized by an efficient distribution of metal and a maximum amount of strength, and which may be manufactured with a relatively great degree of certainty as to freedom from defects.

The invention is illustrated in the accompanying drawings in which Figure 1 is a front view in elevation of a wheel center embodying the present invention; Fig. 2 is an enlarged section taken on the line II—II of Fig. 1; Fig. 3 is an enlarged section taken on the line III—III of Fig. 1; Fig. 4 is an enlarged section taken on the line IV—IV of Fig. 1; Fig. 5 is an enlarged section taken on the line V—V of Fig. 1; Fig. 6 is an enlarged section taken on the line VI—VI of Fig. 1; Fig. 7 is a front view in elevation of another form of wheel center embodying the present invention; Fig. 8 is an enlarged section taken on the line VIII—VIII of Fig. 7; Fig. 9 is an enlarged section taken on the line IX—IX of Fig. 7; Fig. 10 is an enlarged section taken on the line X—X of Fig. 7; Fig. 11 is an enlarged section taken on the line XI—XI of Fig. 7; and Fig. 12 is an enlarged section taken on the line XII—XII of Fig. 7. The tires of the wheels are shown in the drawings in broken lines in Figs. 1 and 7.

Referring in detail to the drawings the wheel structure comprising the present invention is of a hollow four walled or box section type. Referring to the first embodiment, the spokes are hollow and comprise four walls adapted to support wheel carrying loads and including a front wall 1 and a rear wall 2 which are especially adapted to resist revolving or turning stresses, and side walls 3—3 which are especially adapted to resist lateral or wheel flange stresses. These walls are of uniform thickness and the front or outside wall 1 is provided with an opening 4 having a cover plate 5 disposed thereon and welded about its edges at 6. The axle hub, crank pin hub and rim structures are likewise hollow (Figs. 5 and 6). The hub structures comprise front and rear walls 1b and 2b which are continuations of the front and rear walls 1 and 2 of the spokes, an inner side wall 7, which wall 7 surrounds the axle hub and crank pin hub openings 10, the inner wall of the wheel hub, and fourth walls 8, between the spokes, which are continuations of their adjacent spoke side walls 3. The rim structure comprises front and rear walls 1c and 2c which are continuations of the front and rear walls 1 and 2 of the spokes, an outer wall 9 which surrounds the entire wheel center, and fourth inner walls 3c between the spokes, which are continuations of their adjacent spoke side walls 3. The wheel is provided with a tire 21 of usual formation which is secured around the outer wall 9 of the rim of the wheel center in the ordinary manner. The dispositions of the side walls of the spokes and their continuations define the through openings between the spokes, and the wall 7 defines the axle hub and crank pin hub openings 10 of the wheel structure.

An integral counterbalance 11 is formed on one side of the wheel structure, the spokes adjacent this counterbalance being shortened accordingly and a solid strengthening connector 12 is provided between the central portion of the counterbalance and the axle hub. A purpose of this connector is to provide an easier flow of metal, when casting, from the hubs to the counterbalance, thereby lessening the likelihood of shrinkage cracks during the different periods of cooling. Pockets 13 are drilled into the counterbalance block near the rim of the wheel and lead is deposited within the pockets for increasing the weight of the counterbalance. Plugs 14 are welded into the pockets after the lead has been placed therein.

The wheel illustrated in Figs. 7 to 12 inclusive is formed similarly to the wheel illustrated in Figs. 1 to 6 inclusive, the like parts being indicated on the drawings by like reference characters, with the letter "a" added thereto on the wheel illustrated in Figs. 7 to 12 inclusive.

In this form of wheel structure the counterbalance is not cast solid but comprises a cored space 15 open at the front and divided into separate spaces 16 by transverse partition walls 17. The spaces 16 are covered by a plate 18 secured at the ends of the walls 17 by headless studs 19 with their ends welded over, and the plate is welded around its edge, as indicated at 20, to the wheel structure. The spaces 16 are filled with lead (not shown) to provide the counterbalance. The cover plate 18 is made of a thickness to provide any necessary additional weight over that which is provided by the lead in the spaces 16, and the plate may be machined off to reduce it to the required thickness in order to obtain the exact desired adjustment.

The openings 4 and 4a in the spokes of the wheels are provided to permit the removal of the core used to form the hollow of the wheel structure in the casting of the same and also to permit the escape of gases during the process of casting. The cover plates 5 and 5a are applied after the core has been removed so as to exclude any foreign matter from entering the hollows.

In the wheel illustrated in Figs. 7 to 12 inclusive, it will be seen that the walls 3a, 8a and 3ac define the through openings between the spokes. The wall 7a defines the axle hub and crank pin hub openings 10a of the wheel structure, and the wall 9a surrounds the entire wheel center. The axle hub and crank pin hub structures are defined by the walls 7a, 1ab, 2ab and 8a, and the rim structure is defined by the walls 9a, 3ac, 1ac and 2ac. The short spokes and the connector employed in the first described embodiment are not present in this form by reason of the relatively large size of the counterbalance space 15 which extends, at its central or widest part, from the wall 9a to the axle hub structure.

It will be apparent from the foregoing description that the present invention provides a wheel structure wherein there is a more efficient distribution of the metal throughout, thus avoiding losses resulting from shrinkage cracks hereinbefore referred to, and which structure is of relatively great strength.

While there has been hereinbefore described approved embodiments of the present invention, it will be apparent to those skilled in the art that many and various changes and modifications may be made thereto without departing from the spirit of the invention, and that all such changes and modifications that fall within the scope of the appended claims are contemplated as a part of this invention.

The invention claimed and desired to be secured by Letters Patent is:

1. A locomotive driving wheel center of substantial box section formation comprising an axle hub; a crank pin hub; a rim and walls arranged to support carrying loads, certain of said walls being arranged to resist turning stresses and certain of said walls being arranged to resist wheel flange stresses, and said wheel center having cored cavities within said walls substantially surrounding said axle hub and crank pin hub and adjacent to said rim.

2. A locomotive driving wheel center of substantial box section formation comprising walls arranged to support carrying loads, certain of said walls being arranged to resist turning stresses and certain of said walls being arranged to resist wheel flange stresses, said wheel center being provided with cored spaces adapted for the introduction of counterbalance material.

3. A locomotive driving wheel center of substantial box section formation having a counterbalance weight portion provided with pockets for the reception of relatively heavy material for adjusting its weight.

4. A locomotive driving wheel center of substantial box section formation having a counterbalance formed integrally therewith.

5. A locomotive driving wheel center of substantial box section formation provided with cored spaces for the introduction of counterbalance material; and a covering means for said spaces.

6. A locomotive driving wheel having a wheel center of substantial box section formation comprising walls arranged to support carrying loads, certain of said walls being arranged to especially resist turning stresses and certain of said walls being arranged to especially resist wheel flange stresses, and a counterbalance portion; and a separate weight attached to said portion.

7. A locomotive driving wheel having a wheel center of substantial box section formation comprising walls arranged to support carrying loads, certain of said walls being arranged to especially resist turning stresses and certain of said walls being arranged to especially resist wheel flange stresses, said walls having openings formed therein to permit removal of core substance and relief of gases from the interior of said center; and covering means secured over said openings.

8. A locomotive driving wheel center formed as an integral casting of substantial box section formation comprising an axle hub; a crank pin hub; and walls arranged to support carrying loads, certain of said walls being arranged to especially resist turning stresses and certain of said walls being arranged to especially resist wheel flange stresses, and said casting having cored cavities within said walls substantially surrounding said axle hub and crank pin hub.

9. A locomotive driving wheel center formed as an integral casting of substantial box section formation comprising an axle hub; a crank pin hub; and a plurality of spokes comprising walls arranged to support carrying loads, certain of said walls being arranged to especially resist turning stresses and certain of said walls being arranged to especially resist wheel flange stresses, said casting having cored cavities substantially surrounding said axle hub and crank pin hub, said spokes being of hollow formation throughout their lengths and said spoke hollows communicating with said cored cavities surrounding said hubs.

10. A locomotive driving wheel center formed as an integral casting of substantial box section formation comprising an axle hub; a crank pin hub; a rim; and a plurality of spokes comprising walls arranged to support carrying loads, certain of said walls being arranged to especially resist turning stresses and certain of said walls being arranged to especially resist wheel flange stresses, said casting having cored cavities substantially surrounding said axle hub and crank pin hub and adjacent to said rim, said spokes being of hollow formation throughout their lengths and said spoke hollows communicating with said cored cavities surrounding said hubs and adjacent to said rim.

11. A wheel center comprising a hub; a rim; front and rear substantially vertical spaced walls of substantial disc shape disposed between and connecting said hub and rim, said walls having registering openings; and transverse walls connecting said front and rear walls along opposite edges of said openings, said front, rear and transverse walls combining to form hollow four-walled spokes box-shaped in cross section and to provide cavities within said center around said hub and adjacent to said rim.

12. In a locomotive driving wheel center, a hub; a hollow rim; a counterbalance; and hollow spokes with walls extending transversely of the plane of said wheel center and merging with the inner wall of said rim, a wall of the spoke nearest said counterbalance extending radially to the outer wall of said rim.

JAMES G. BLUNT.